Sept. 6, 1938.  C. G. ELY ET AL  2,129,169
ILLUMINATED DIAL
Filed Sept. 5, 1935  3 Sheets-Sheet 2
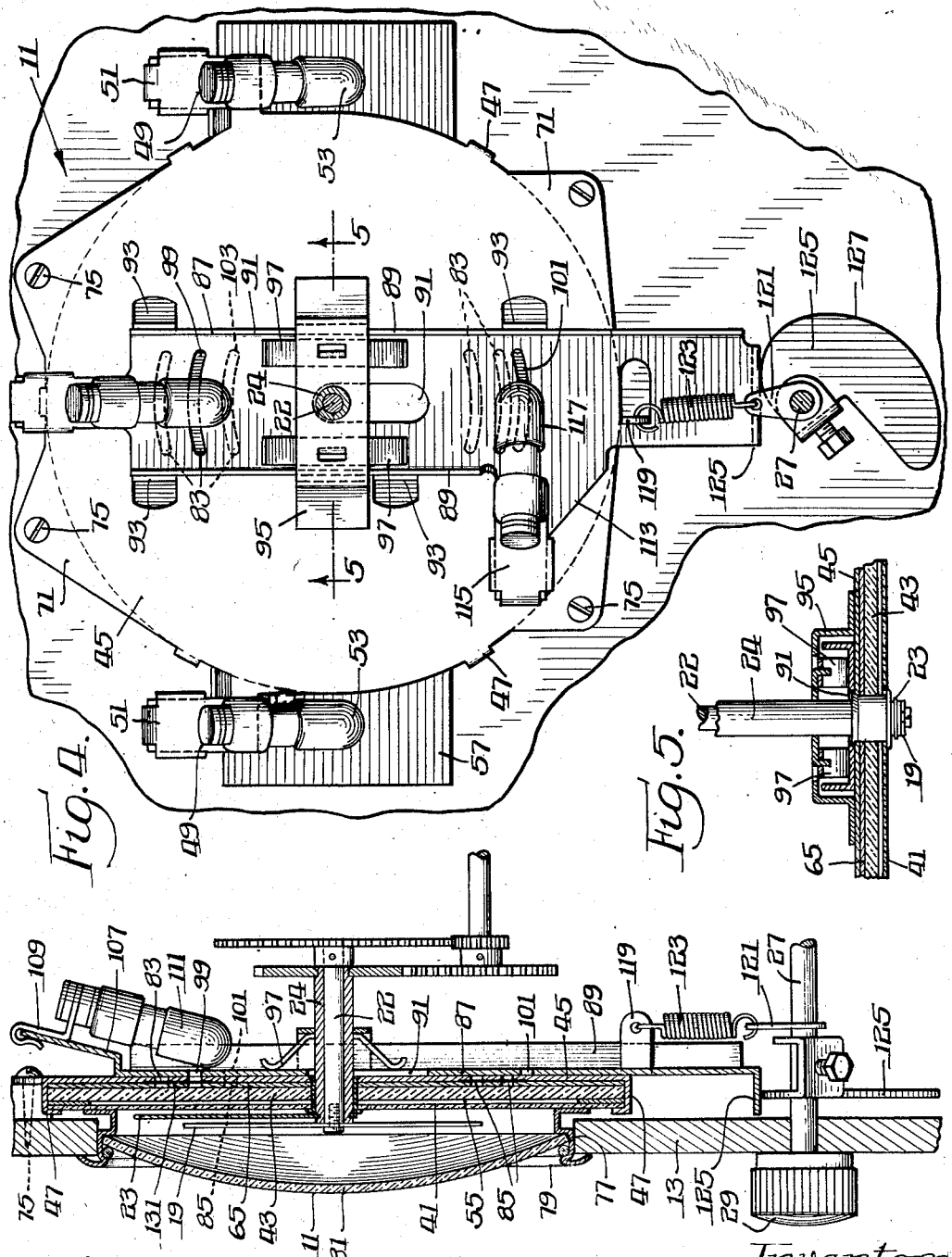
Inventors
Cornelius G. Ely
Earl H. Allen
By:- Cox & Moore attys.

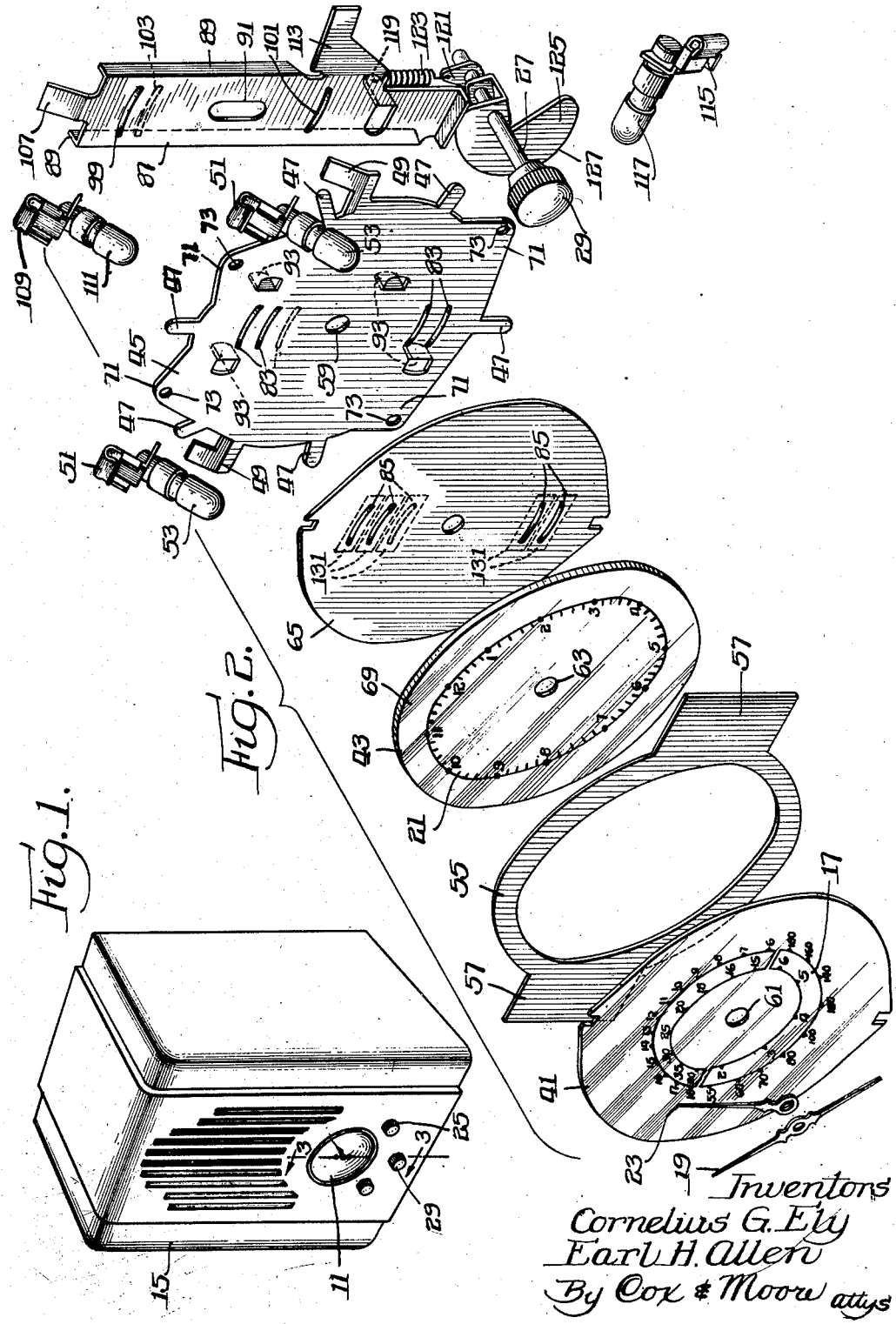

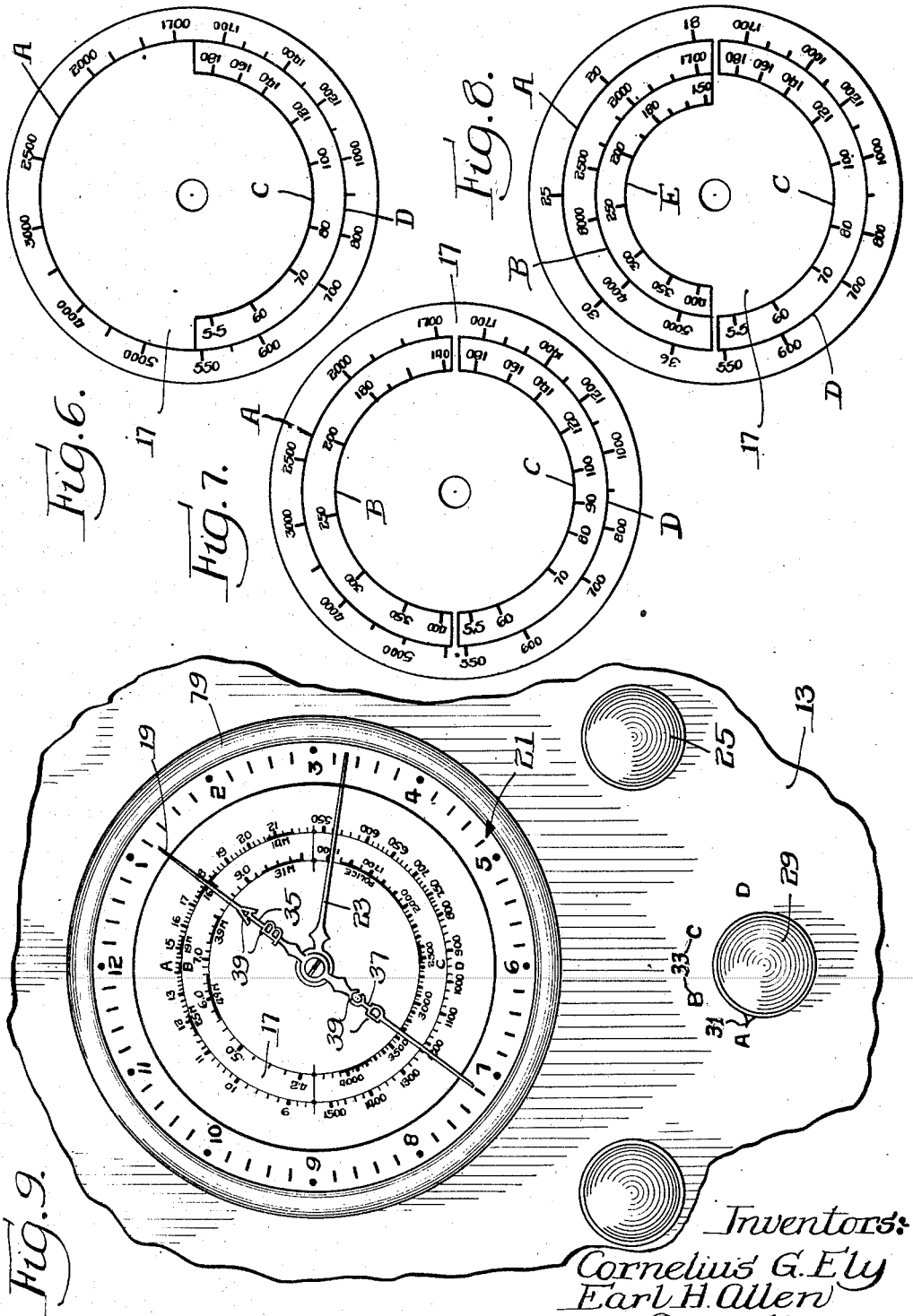

Patented Sept. 6, 1938

2,129,169

UNITED STATES PATENT OFFICE 2,129,169

ILLUMINATED DIAL

Cornelius G. Ely, Chicago, and Earl H. Allen, Oak Park, Ill., assignors, by mesne assignments, to Reconstruction Finance Corporation, Chicago, Ill., a corporation Application September 5, 1935, Serial No. 39,320

25 Claims. (Cl. 116—124.1)

Our invention relates in general to indicators and has more particular reference to an indicator for radio receivers.

An important object is to provide an illuminated indicator providing an attractive appearance with improved indicator visibility without glare.

Another important object is to provide an indicator embodying a dial plate of glass or similar material including facilities for illuminating the edges of the plate to thus render the entire dial visible without direct or reflected light glare upon the eye of an observer.

Another object is to provide an indicator having a plurality of selectively operable scales including means to indicate which of the scales is in use.

Another object is to provide an indicator having a translucent dial formed with a plurality of scales and co-operating pointer means including selectively operable illuminating means to indicate any of said scales at will; a further object being to provide for the selective illumination of portions of the dial opposite said scales, and more particularly to accomplish selective illumination by means of an opaque screen behind the dial and having windows opposite said scales, and a shiftable shutter normally covering the windows and shiftable to uncover said windows to permit illumination of the dial therethrough.

A further object is to provide the several windows with panes of translucent material in contrasting colors whereby to illuminate the several scales each with an individual identifying color to facilitate identification.

Another object is to provide an indicator having a graduated master scale and co-operating pointer with means to facilitate accurate adjustment of the pointer and scale comprising an additional pointer having geared relationship with the scale pointer and adapted to travel the scale dial proportionally more rapidly than the scale pointer including an additional scale on the dial to cooperate with the additional pointer whereby to provide an auxiliary indication, on an enlarged scale, of the relative position of the scale pointer with respect to the master scale.

Another object is to gear the main scale and auxiliary pointer together with a ratio of twelve to one and to arrange the auxiliary scale clockwise with twelve main graduations so that the relative position of the main scale pointer on the main scale may be determined as a clock indication on the auxiliary scale using the main scale pointer as the hour and the auxiliary pointer as the minute hand.

Another object is to form the dial with a plurality of main scales, one of which occupies one half, for example the upper half, and another of which occupies the remaining half of the main scale portion, while the scale pointer comprises a plurality of tynes, one for each of the main scales.

Another object is to identify the scales with a character and to form the scale pointer with a replica of the character on the tyne corresponding to the scale identified by the character.

Another object is to color the main scale pointer and the auxiliary pointer in contrasting colors, preferably black for the main pointer and white for the auxiliary pointer.

Another object is to provide an indicator dial comprising a scale carrying card and means to indirectly illuminate the card comprising a plate of glass or other material mounted in front of the card and means to light up the edges only of the plate.

Another object is to form either the main or the auxiliary scale by printing or otherwise, while forming upon a scale carrying element or card the other scale, preferably by etching, upon a plate of glass or similar material arranged in front of the card, and illuminating both scales indirectly by directing light upon the edges only of the etched plate.

Another object is to provide an indicator having any of the features heretofore mentioned for use in combination with adjustable mechanism in order to give an indication of the adjusted condition of the mechanism.

Another object is to provide, in combination with apparatus adjustable to operate under any of several predetermined bands or zones of operating conditions, an indicator having scales corresponding each with an operating ban or zone and means adjustable with the apparatus to visually designate which of said bands corresponds with a zone in which the apparatus is operating at any instant.

A further object being to adjust the indicator with the apparatus within any operating zone or band so as to give an indication of the operating condition of the apparatus throughout the range of each zone.

A still further object is to apply the indicator specifically in a radio receiver to indicate the tuned condition of the receiver.

Among the other object of the invention is to provide an indicator having the structural advantages, simplicity of fabrication and of use as hereinafter set forth.

Numerous other objects, advantages, and inherent functions of the invention will be apparent from the following description, which, taken in connection with the accompanying drawings, discloses preferred embodiments of the invention.

Referring to the drawings:

Figure 1 is a perspective view of a radio receiver embodying a dial containing our present invention;

Figure 2 is an exploded view in perspective of parts forming a preferred embodiment of the invention;

Figure 3 is a sectional view substantially along the line 3—3 in Figure 1;

Figure 4 is a rear view of the indicator mechanism;

Figure 5 is a modified construction of a part shown in Figure 4;

Figures 6, 7, and 8 are forms of dials for various purposes; and

Figure 9 is a front view of a modified form of indicator embodying the invention.

To illustrate our invention, we have shown on the drawings an indicator 11 more particularly adapted for showing the adjusted or tuned condition of a radio receiver, although it will be obvious that the indicator may, of course, be used for other purposes. In any event, we have shown the indicator mounted in a wall 13 of a cabinet 15 containing a radio receiving apparatus, which it will be understood includes adjustable tuning mechanism.

The indicator comprises means forming a scale means 17 and an adjustable pointer 19, the scale means and pointer being relatively shiftable in proportion to the adjustment of the tuning means of the radio receiver in order that the scale and pointer may indicate the adjusted position of the receiver in any position throughout its operating range. To this end, the scale means is graduated to correspond with the operating range of the apparatus with which the indicator is operatively associated.

Radio receivers and other adjustable sensitive apparatus may require a relatively minute movement of the adjusting mechanism and hence of the indicator 19 with respect to the scale means in order to adjust the apparatus from one set position to another. Such adjustment is often so minute as to be difficultly discernible on the scale means, it being understood that adjusting movement of the apparatus is communicated to the indicator preferably by connecting the pointer 19 directly with the adjustable mechanism of the radio receiver, the scale means being stationary. In order to afford a more readily discernible indication, we provide, in the indicator, an additional scale 21 and an additional pointer 23 in position to cooperate with the scale 21. The pointer 23 is drivingly associated with the pointer 19 in such a way that the relative movement of the pointer 19 with respect to the scale means 17 imparts a proportionately larger relative movement between the pointer 23 and the scale 21. The indicator is preferably of the dial type, the scale means 17 being arranged circularly and the pointers 19 and 23 being mounted on spindles 22 and 24 for rotation about an axis centrally of the scale means 19 in position to sweep around said scale means. The scale 21 is also circular and concentric with respect to the scale means 17 and is provided with equally spaced graduations comprising a multiple of the ratio of the relative movement between the scale 21 and pointer 23 and the relative movement between the pointer 19 and the scale means 17. The scale 21 is preferably provided with equally spaced graduations comprising a multiple of twelve while the pointers 19 and 23 have a movement ratio as one is to twelve.

The pointer 19 extends into position co-operating with the scale means 21 and it will be seen that the position of the pointer 19 with respect to the scale means 17 can be indicated as a composite reading of both pointers on the scale 21. This composite reading, where the scale 21 is arranged clockwise with twelve equally spaced graduations and the movement ratio of the pointers 19 and 23 is as one is to twelve, will comprise a clock indication so that each and every position of the pointer 19 with respect to the scale means 17 may be designated as a timely indication on the clockwise scale 21. It will be obvious also that for a given deflection of the pointer 19 with respect to the scale means 17, the pointer 23 will have a corresponding deflection twelve times greater so that the movement of the pointer 19 with respect to the scale means 17 is in effect multiplied by twelve and the possible accuracy and precision of adjustment multiplied to like degree.

The combination of the scale 21 with the pointer 19 and the addition of the pointer 23 consequently increases the possibilities of accurate adjustment of the mechanism which, of course, is performed manually as by means of a knob 25 forming a part of the radio receiver and drivingly connected with the adjustable means of the receiver.

In the embodiment illustrated in Figure 9 of the drawings, the scale means 17 comprises four separate scales designated A, B, C, and D. These scales each comprise a semi-circular scale portion, the scales A and D forming a complete circular scale while the scales B and C form a complete circular scale concentric with respect to the circular scale formed by the scales A and B.

The scales A, B, C, and D represent various operating bands within the range of the receiver although it is ordinarily necessary to condition the receiver as by means of a turnable shaft 27 operatively connected with adjusting mechanism of the receiver and projecting forwardly through the wall 13 preferably adjacent the indicator and having an adjusting knob 29 on its projecting end. The knob 29 carries a pointer 31 and the wall has indicia 33 opposite which the pointer 31 may be set to indicate the corresponding band for operation in which the receiver is conditioned by the setting of the knob 29.

The clockwise precision indicator may, however, be utilized where the indicator comprises only one scale, the associated receiver being fixed for operation within the band for which said single scale is graduated. However, the indicator lends itself particularly well for use with receivers conditionable for operation in several bands. Where, for instance, as shown in Figure 9, the indicator comprises at least two scales A and D together forming a complete circular scale, as well as where additional scales, such as B and C are required in the indicator, it will be obvious that the adjustment of the receiver throughout the extent of all bands will require the pointer 19 to travel through a maximum angular displacement of 180°. To this end, the pointer 19 has a portion 35 arranged to sweep across the upper scale or scales A and B and another portion 37 adapted to simultaneously sweep across the lower scale portions C and D. With such an arrangement, the clockwise indication for the upper scales may be determined by the pointer 23 and the pointer portion 35 while the indication for the lower scales may be determined by the pointer 23 and the pointer portion 37.

We find it convenient also to form the pointer portions 35 and 37 with indicia 39 to designate the scales with which said pointer portions are associated. The pointers 19 and 23 may, if desired, and in fact preferably are formed in contrasting colors, the pointer 19 preferably being colored black while the pointer 23 is white.

The indicator, obviously, may be arranged to contain any desired number of scales.

Our invention also contemplates the provision of an indicator having an indirectly illuminated scale dial so that when the device is in operation, it may be rendered clearly visible without however transmitting glare to the eye of the observer. To this end, we propose means for illuminating the dial uniformly with a suffused glow by arranging the scale means 17 on a sheet of translucent material 41 and arranging a plate 43 of light refractive material, such as glass behind the scale-carrying sheet 41, both sheets being mounted in stacked relationship upon a supporting element 45 preferably comprising a sheet metal plate formed with lugs 47 adapted to be wrapped around the edges of the sheet 41 and plate 43 in order to retain the same in position.

The frame 45 also is formed with lugs 49 adapted to receive mounting clips 51 by means of which lamps 53 comprising sources of illumination may be mounted in position to illuminate the opposite edges of the glass plate 43. In this fashion, light from the sources 53 will penetrate through the refractive layer formed by the plate 43 and create a diffused uniform illumination behind the scale-carrying sheet 41, which will thus become lighted up in an attractive manner rendering the scale means 17 highly visible without however permitting direct glare to reach the eyes of an observer.

In order to preclude transmission of direct rays to the eye of the observer from the edges of the plate 43, we may interpose a screen 55 comprising an annular gasket of opaque material, such as paper, between the marginal edges of the sheet 41 and the sheet 43. The gasket 55 has preferably wing-like extensions 57 formed at its opposite sides in position to screen the light sources 53.

As an alternate arrangement, the gasket 55 may be eliminated and a corresponding opaque rim formed on the peripheral edges of the sheet 41 in order to perform the direct-ray screening function. In this event, the sheet 41 may be formed with wing-like extensions similar to the extensions 57 of the gasket, which extensions may also be made opaque to screen the light sources 53. The sheet 41 and the plate 43 being translucent and substantially transparent, the indicator will have a back ground characterized by the texture and color of the plate forming the frame 45. This plate may, of course, be substantially imperforate throughout its area, save for a central opening 59, there being corresponding openings 61 and 63 in the sheet 41 and plate 43 to accommodate the pointer spindles 22 and 24. Consequently, the background color of the indicator may be determined by finishing the backing plate 45 in any desired fashion. However, for certain purposes, we find it desirable to interpose a backing plate 65 of any suitable material and preferably thin sheet metal between the frame 45 and the refractive plate 43, the plate 65 having a central spindle opening 67 and being finished to a desired background color or texture in its surfaces facing the plate 43.

While the auxiliary scale 21 may, of course, be formed on the sheet 41, we prefer to form this scale upon the rearward surface of the plate 43, which surface faces the support frame 45 and the backing plate 65 if and when utilized between the plate 43 and the frame 45. The scale 21 may be formed conveniently as by etching the surface of the glass and by filling the etched portions with a suitable pigment, such as white lacquer, to render the scale and the graduations thereof highly visible through the plate 43 and the sheet 41 when the plate 43 is illuminated as aforesaid. It will be noted that the scale means 17 is concentrically arranged within the circular scale 21 in the finished indicator. Within the scale means 17 is a relatively large circular area in which any desired decorative or informative subject matter may be displayed. Such decorative or informative subject-matter may be applied by printing or otherwise forming the same upon the central area of the sheet 41 within the scale means 17 or by etching the same upon the central areas of the plate 53. We prefer also to uniformly etch the annular area 69 in the plate 43 which extends opposite and behind the scale means 17 in the indicator as finally assembled and to coat this uniformly etched portion with a preferably white lacquer paint so that the scales A, B, C, and D, which are preferably painted in black pigment on the sheet 41, may be displayed against a background of contrasting color to render the same more readily eligible to the observer.

It will be noted also that the sheet 41, the plate 43, the gasket 55, and the background plate 65 are of generally circular configuration and that the frame 45 is likewise of generally circular configuration in order to facilitate alignment of the parts at their edges by means of the fastening lugs 47. In this way, assembly of the parts is facilitated with the openings 59, 61, 63, and 67 in alignment.

The frame 45 is preferably formed with outstanding ears 71 formed with perforations 73 whereby the indicator may be attached to the wall 13 of the cabinet as by means of suitable fastening members 75 penetrating the openings 73 and taking into the wall 13 to thereby mount the indicator in position opposite a circular opening 77 in the wall, the edges of which, as shown in Figure 3, may be formed with an annular finishing strip 79 having facilities for supporting a transparent cover plate 81 in front of the face of the indicator in order to protect the scale carrying sheet 41 and the pointers 19 and 23 from damage.

While we have shown in Figure 9 a mode of indicating which of the several scales A, B, C, or D, comprising the scale means 17 is functioning at any instant by applying identifying indicia adjacent the scales and corresponding indicia 33 in co-operation with the adjusting knob 29 and indicia 39 on the pointer 19, we propose to provide for selectively illuminating the several scales to indicate operation of the same, thereby eliminating the necessity of providing indicia 33 and 39 as well as scale designating indicia A, B, C, and D.

To this end, the plate 65 as well as the background plate 65 are provided with registering openings 83 and 85 forming windows opposite the several scales whereby to illuminate the scales by means of light through said windows, shutter means 87 being provided to normally close the windows. The shutter means 87 are operable in response to the manipulation of the knob 29 to open the window opposite the scale representing the band within which the associated radio receiver is conditioned for operation by the adjusted position of the knob 29.

The number of windows formed by the openings 83 and 85 will, of course, correspond with the number of band scales in the indicator and as previously suggested, the indicator may be formed with any desired number of band scales. In the illustrated embodiment, however, we have shown openings 83 and 85 in solid lines providing four windows and we have indicated in dotted lines the approximate position of additional openings 83 and 85 to provide a fifth window if desired.

The shutter 87 comprises an elongated channeled element having marginal flanges 89 and an elongated opening 91 adapted to receive the pointer spindles 22 and 24 without impeding the operating movement of the shutter, which is slidably mounted upon the back of the frame 45 in position to cover the window openings 83. The shutter is slidable on the frame between struck-out lugs 93 forming a guideway for the shutter, the shutter being retained in place by means of a strap 95 secured to the back of the frame and carrying springs 97 in position to press the shutter snugly against the rear of the plate 45.

As is apparent, some of the window openings 83 will be disposed in the plate 45 above the spindle opening 59, while others of the openings 83 will be formed in the plate 45 at like distance below the spindle opening. The shutter is formed with an opening 99 substantially corresponding in shape to the openings 83 above the spindle opening 59. The shutter is also formed with another opening 101 below the opening 91 and corresponding substantially in shape to the openings 83 below the spindle opening 59.

The several scales A, B, C, and D may be arranged in any suitable or convenient relationship on the indicator dial. In Figures 6, 7, and 8, however, we have shown preferred arrangements respectively comprising 3, 4, and 5 band scale arrangements and have identified the scales to correspond with the alphabetical identification of corresponding scales in the embodiment shown in Figure 9.

The scales illustrated in Figures 6, 7, 8, and 9 are graduated in terms of frequency. They may, of course, be graduated in terms of wave-length or other units depending upon the apparatus with which the indicator is used.

The shutter may be shifted behind the frame plate 45 along a path limited only by the length of the slot 91 and the openings 99 and 101 are positioned in the shutter so that in moving from its lowermost position, the openings 99 and 101 will be placed in registration with the openings 83 in a desired sequence. As shown in the drawings, the openings 99 and 101 are positioned to illuminate a four-band indicator of the character shown in Figure 7 in the sequence B, D, A, C as the shutter is moved from its lowermost to its uppermost position.

In a three-band indicator, as shown in Figure 6, we prefer to eliminate scale B and to arrange the shutter to open the windows in the sequency D, A, and C in moving from its lower to its upper position.

In a two-band indicator, we prefer to eliminate scales B and C or the scales A and D and to operate the shutter to open windows in a sequence to illuminate first the lower scale and then the upper scale in moving from its lower to its upper position.

In providing for a five-band indicator, the opening 99, shown in full lines of the drawings, will be closed and the opening indicated in dotted lines at 103 will be provided in its place. The scale representing the fifth band will be printed as at E in Figure 8 and the corresponding window openings 83 and 85 as shown in dotted lines will be provided. The shutter so arranged will provide for opening the windows in the sequence E, D, B, C, and A.

To provide light sources for illuminating the scales through the windows provided by the openings 83 and 85, the shutter 87 is formed with a projecting ear 107 at its upper end on which to mount a clip 109 carrying a lamp 111 providing a lamp source in position behind the slot 99 for the 2, 3, and 4 band indicator. Where the shutter is arranged with a slot 103 in providing a five-band indicator, the lug 107 may be shortened by an amount equal to the distance between the positions of the slots 99 and 103 so that the lamp will be mounted opposite the opening 103 when the clip 109 is on the shortened lug. The shutter 87 also carries an additional lug 113 at its lower end in position to receive a clip 115 similar to the clip 109 and carrying a lamp 117 in position opposite the opening 101.

Any suitable or convenient mechanism may be employed to shift the shutter in response to the adjusting movement of the shaft 27. We prefer, however, to form the shutter with a struck-out lug 119 near its lower end and to mount a washer 121 loosely on the shaft below the lug. The lug and washer may be connected by a resilient tension spring 123 whereby the shutter is normally urged downwardly on the frame 45. The lower end of the shutter is preferably formed with a flange 125 while the shaft 27 carries an element 127 having a cam-like edge 129 adapted to bear against the flange 125 and raise the shutter on the frame 45 against the tension of the spring 123 as the shaft 27 is turned. This will cause the shutter to be supported at different elevations on the frame 45 corresponding with the various set positions of the adjusting shaft, which, in turn, determines the bands in which the associated radio receiver is adjusted.

If desired, a sheet of translucent colored material may be interposed between the plates 45 and 65 opposite the window openings 83 and 85. A differently colored material may be used in each window so that the various scales may be illuminated in contrasting colors in order to facilitate differentiation of the scales by the observer.

The openings 83 and 85 also may have any desired form, although we prefer to utilize elongated slots. The openings, however, may comprise a plurality of openings arranged in curved alignment, or may comprise a single opening of circular, square, or other configuration.

We find that the indicator of our present invention has many advantages, particularly where used in combination with a radio receiver. The indirect illumination of the indicator provided by edge-lighting the plate 43 provides a suffused, yet uniform illumination of the entire dial rendering the scales and pointers highly visible against an attractive background provided by the texture of the plate 45 or the plate 65 where such a plate is utilized in the assemby. The clockwise scale 21 and its associated pointer also makes adjustment of the scale and associated apparatus extremely sensitive and critical. Furthermore, this arrangement permits logging of stations on a radio receiver by simply adjusting the mechanism to set the dial to a previously known clock indication, which greatly facilitates the adjustment of the apparatus by unskilled persons.

It is though that the invention and numerous of its attendant advantages will be understood from the foregoing description and it is obvious that numerous changes may be made in the form, construction, and arrangement of the several parts of the illustrated apparatus without departing from the spirit or scope of our invention or sacrificing any of its attendant advantages, the preferred modes and forms herein described being merely for the purpose of illustrating the invention.

Having thus described our invention, what we claim as new and desire to secure by Letters Patent is as follows:

1. An indicator comprising indicator means including a master scale, an auxiliary scale, and cooperating pointer means for said scales, the pointer means and said scales being relatively shiftable, means drivingly interconnecting the indicator means so that relative movement between the master scale and the pointer means is proportional to the corresponding movement between the auxiliary scale and the pointer means, whereby the adjusted position of the indicator may be determined in terms of the relative position of the pointer means with respect to the scales, said master scale being formed on a sheet of translucent material, a light screen behind said sheet and formed with a window opening opposite said scale, whereby to illuminate said sheet at or adjacent said scale by means of light passing through said window opening, including shutter means operable selectively to prevent and permit the passage of light through said window opening.

2. An indicator comprising indicator means including a plurality of master scales, an auxiliary scale, and cooperating pointer means for said scales, the pointer means and said scales being relatively shiftable, means drivingly interconnecting the indicator means so that relative movement between the master scales and the cooperating pointer means is proportional to the corresponding movement between the auxiliary scale and the pointer means, whereby the adjusted position of the indicator may be determined in terms of the relative position of the pointer means with respect to the auxiliary scale and any selected one of the master scales, said master scales being formed on a translucent sheet in spaced relationship, means forming a light screen behind said sheet and provided with window means in registration with said master scales whereby to illuminate said translucent sheet at or adjacent said scales by means of light passing through said window means, and shutter means operable to selectively control the light passing said window means in order to indicate a selected one of said master scales.

3. An indicator comprising indicator means including a master scale, an auxiliary scale, and cooperating pointer means for said scales, the pointer means and said scales being relatively shiftable, means drivingly interconnecting the indicator means so that relative movement between the master scale and the pointer means is proportional to the corresponding movement between the auxiliary scale and the pointer means, whereby the adjusted position of the indicator may be determined in terms of the relative position of the pointer means with respect to the scales, said master scale being formed on a scale-carrying element, a pane of translucent material disposed adjacent the scale-carrying element, and means to illuminate the edges of the pane whereby to indirectly illuminate the scale-carrying element to assist in improving the visibility of the master scale thereon.

4. An indicator comprising indicator means including a master scale, an auxiliary scale, and cooperating pointer means for said scales, the pointer means and said scales being relatively shiftable, means drivingly interconnecting the indicator means so that relative movement between the master scale and the pointer means is proportional to the corresponding movement between the auxiliary scale and the pointer means, whereby the adjusted position of the indicator may be determined in terms of the relative position of the pointer means with respect to the scales, said master scale being formed on a scale-carrying element, and the auxiliary scale being etched upon a pane of glass disposed adjacent the scale-carrying element, and means to illuminate the edges of the pane to improve the visibility of the auxiliary scale etched thereon.

5. An indicator comprising indicator means including a master scale, an auxiliary scale, and cooperating pointer means for said scales, the pointer means and said scales being relatively shiftable, means drivingly interconnecting the indicator means so that relative movement between the master scale and the pointer means is proportional to the corresponding movement between the auxiliary scale and the pointer means, whereby the adjusted position of the indicator may be determined in terms of the relative position of the pointer means with respect to the scales, said master scale being formed on a scale-carrying element, and the auxiliary scale being etched on a pane of glass disposed adjacent the scale-carrying element, and means to illuminate the edges of the pane to improve the visibility of the master scale and to indirectly illuminate said auxiliary scale to render the same more highly visible through the glass pane.

6. An indicator comprising indicator means including a master scale, an auxiliary scale, and cooperating pointer means for said scales, the pointer means and said scales being relatively shiftable, means drivingly interconnecting the indicator means so that relative movement between the master scale and the pointer means is proportional to the corresponding movement between the auxiliary scale and the pointer means, whereby the adjusted position of the indicator may be determined in terms of the relative position of the pointer means with respect to the scales, said master scale being formed on a scale-carrying element, and the auxiliary scale being etched on a pane of glass disposed adjacent the scale-carrying element, means to illuminate the edges of the pane to improve the visibility of the master scale and to indirectly illuminate said auxiliary scale to render the same more highly visible through the glass pane, and means comprising a light source disposed behind said scale-carrying element for directly illuminating the master scale thereon.

7. An indicator comprising indicator means including a plurality of master scales, an auxiliary scale, and cooperating pointer means for said scales, the pointer means and said scales being relatively shiftable, means drivingly interconnecting the indicator means so that relative movement between the master scales and the cooperating pointer means is proportional to the corresponding movement between the auxiliary scale and the pointer means, whereby the adjusted position of the indicator may be determined in terms of the relative position of the pointer means with respect to the auxiliary scale and any selected one of the master scales, said master scales being formed on a translucent scale-carrying element and the auxiliary scale being etched on a glass pane disposed adjacent the scale-carrying element, means to illuminate the edges of the pane to indirectly illuminate said auxiliary scale thereon, and means forming a light screen behind said scale-carrying element and formed with window openings in registration with said master scales, whereby to illuminate said scale-carrying element at or adjacent said master scales to render the same highly visible by means of light passing through said window openings.

8. An indicator comprising indicator means including a plurality of master scales, an auxiliary scale, and cooperating pointer means for said scales, the pointer means and said scales being relatively shiftable, means drivingly interconnecting the indicator means so that relative movement between the master scales and the cooperating pointer means is proportional to the corresponding movement between the auxiliary scale and the pointer means, whereby the adjusted position of the indicator may be determined in terms of the relative position of the pointer means with respect to the auxiliary scale and any selected one of the master scales, said master scales being formed on a translucent scale-carrying element and the auxiliary scale being etched on a glass pane disposed adjacent the scale-carrying element, means to illuminate the edges of the pane to indirectly illuminate said auxiliary scale thereon, and means forming a light screen behind said scale-carrying element and formed with window openings in registration with said master scales, whereby to illuminate said scale-carrying element at or adjacent said master scales to render the same highly visible by means of light passing through said window openings, and color filtering means disposed in said window openings to characterize and identify the master scales each by the color characteristic of the filtering means in its corresponding window opening.

9. An indicator comprising indicator means including a plurality of master scales each representing a predetermined indication range, an auxiliary micrometer scale and pointer means associated with said scales, driving means to relatively shift the pointer means and said scales so that the relative movement between the pointer means and the master scales is proportional to the corresponding movement between the pointer means and the auxiliary scales, said master scales being formed in spaced relationship on a translucent sheet, opaque means forming a stationary light screen disposed behind said sheet and defining stationary openings opposite said scales to permit light to illuminate said scales through said openings, and means operable to selectively direct light rays through said openings whereby to selectively illuminate said scales.

10. An indicator comprising indicator means including a plurality of master scales each representing a predetermined indication range, an auxiliary micrometer scale and pointer means associated with said scales, driving means to relatively shift the pointer means and said scales so that the relative movement between the pointer means and the master scales is proportional to the corresponding movement between the pointer means and the auxiliary scales, said master scales being formed in spaced relationship on a translucent sheet, opaque means forming a stationary light screen disposed behind said sheet and defining stationary openings opposite said scales to permit light to illuminate said scales through said openings, means operable to selectively direct light rays through said openings whereby to selectively illuminate said scales, and color filter means disposed opposite said openings whereby said several scales may be illuminated with light of contrasting color characteristics.

11. An indicator comprising a translucent scale plate, a plurality of arcuate scales representing different radio broadcast bands formed on said plate in concentric relationship, pointer means for said arcuate scales and arranged to turn upon an axis located at the center of curvature of said scales, said scales being formed on the forwardly facing surface of said scale-carrying plate, light-opaque means disposed on or adjacent the back of said plate and having a plurality of openings registering each with one of said arcuate scales on said plate, color filtering means of contrasting character disposed opposite the several openings, whereby said scales may be illuminated by light of contrasting color passing through said openings from behind said opaque means.

12. An indicator comprising the combination of a plurality of juxtaposed dial plates, at least one of which is a glass plate, a circular scale etched on said glass plate, a plurality of arcuate scales representative of different radio broadcast bands formed on another of said plates and concentric with respect to said circular scale, a plurality of pointers arranged to turn upon a common axis, one of said pointers traversing said arcuate scales and another traversing said circular scale, means drivingly connecting the pointers for proportional movement with respect to said scales whereby the adjusted position of the indicator may be determined in terms of the relative position of both pointers with respect to the scales, means for illuminating the edges of the glass plate to illuminate the scale etched thereon, and means to selectively illuminate the arcuate scales with concentrated light of different colors.

13. An indicator comprising a frame, having a window, a movable shutter on said frame, means normally biasing said shutter to close said window, means to move said shutter on the frame to open the window, means to hold the shutter in window open position, a translucent scale carrying sheet in front of said frame in position with the scale opposite said window, a light source on said shutter in position to illuminate the said scale through said window.

14. An indicator comprising a frame member having a series of window openings therein, a translucent scale carrying sheet in front of said frame in position with the scales thereof substantially opposite said windows, a light source in position to illuminate the scales through said windows and a shutter for said windows having an opening and shiftable with respect to the frame to selectively uncover said windows.

15. An indicator comprising a frame member having a series of window openings therein, a translucent scale carrying sheet in front of said frame in position with the scales thereof substantially opposite said windows, a light source in position to illuminate the scales through said windows and a shutter for said windows having an opening and shiftable with respect to the frame to selectively uncover said windows and colored means in each window to characterize and identify the corresponding scale when a window is uncovered.

16. An indicator comprising circular master scale means, indicator means for said scale means and mounted on an axle for rotation with respect to said scale means, a light screen having window apertures opposite remote portions of said scale means whereby to illuminate the same by means of light passing through said window apertures and shutter means for selectively opening and closing said window apertures comprising a slide having an elongated slot receiving said axle.

17. An indicator comprising master scale means, a pointer relatively shiftable with respect to said scale means, a light screen having window apertures opposite remote portions of said scale means whereby to illuminate the same by light passing through said apertures, a shutter for relatively opening and closing said apertures comprising a slide, means comprising a turnable shaft for shifting said shutter, and a spring connected at one end on said shaft and drivingly connected with said shutter for normally urging the same toward said shaft.

18. An indicator comprising a frame, having a window, a movable shutter on said frame, means normally biasing said shutter to close said window, means to move said shutter on the frame to open the window, means to hold the shutter in window open position, a translucent scale carrying sheet in front of said frame in position with the scale opposite said window, and a light source in posittion to illuminate the said scale through said window, the scale-carrying sheet having a plurality of scales and the frame a plurality of windows corresponding each to a scale, the shutter means being operable to open and close said windows selectively.

19. An indicator comprising a frame, having a window, a movable shutter on said frame, means normally biasing said shutter to close said window, means to move said shutter on the frame to open the window, means to hold the shutter in window open position, a translucent scale carrying sheet in front of said frame in position with the scale opposite said window, and a light source in position to illuminate the said scale through said window, a glass plate carried by said frame adjacent said translucent sheet and illuminating means mounted in position for illuminating the edges of said plate to thereby indirectly illuminate the adjacent sheet.

20. An indicator comprising a frame, having a window, a movable shutter on said frame, means normally biasing said shutter to close said window, means to move said shutter on the frame to open the window, means to hold the shutter in window open position, a translucent scale carrying sheet in front of said frame in position with the scale opposite said window, and a light source in position to illuminate the said scale through said window, the scale-carrying sheet having a plurality of scales and the frame a plurality of windows corresponding each to a scale, the shutter means being operable to open and close said windows selectively, and colored means in said windows to cause illumination of the several scales in contrasting colors.

21. An indicator comprising a frame, having a window, a movable shutter on said frame, means normally biasing said shutter to close said window, means to move said shutter on the frame to open the window, means to hold the shutter in window open position, a translucent scale carrying sheet in front of said frame in position with the scale opposite said window, and a light source in position to illuminate the said scale through said window, a glass plate mounted adjacent said translucent sheet and illuminating means mounted in position for illuminating the edges of said plate to thereby indirectly illuminate the adjacent sheet, and a circular scale etched upon the back of said plate and made readily visible through the plate when edges of the same are illuminated.

22. An indicator comprising a frame, having a window, a movable shutter on said frame, means normally biasing said shutter to close said window, means to move said shutter on the frame to open the window, means to hold the shutter in window open position, a translucent scale carrying sheet in front of said frame in position with the scale opposite said window, and a light source in position to illuminate the said scale through said window, a colored backing plate interposed between the frame to impart a color background for the scales, said plate being the translucent scale carrying sheet and formed with openings corresponding to and disposed in alignment with the windows of the frame.

23. An indicator comprising a frame, having a window, a movable shutter on said frame, means normally biasing said shutter to close said window, means to move said shutter on the frame to open the window, means to hold the shutter in window open position, a translucent scale carrying sheet in front of said frame in position with the scale opposite said window, and a light source in position to illuminate the said scale through said window, a glass plate mounted adjacent said translucent sheet, illuminating means mounted in position for illuminating the edges of said plate to thereby indirectly illuminate the adjacent sheet, and screening means for the illuminating means to prevent direct rays from said illuminating means from penetrating forwardly of said indicator.

24. An indicator comprising a frame, having a window, a movable shutter on said frame, means normally biasing said shutter to close said window, means to move said shutter on the frame to open the window, means to hold the shutter in window open position, a translucent scale carrying sheet in front of said frame in position with the scale opposite said window, and a light source in position to illuminate the said scale through said window, said frame comprising a sheet metal plate having lugs struck rearwardly to support the shutter therebetween, additional lugs to support illuminating means opposite the edge of the glass plate and holding means comprising integral lugs adapted to be bent about the edges of the scale-carrying sheet and the glass plate to hold the same in layered relationship on the plate.

25. An indicator comprising a frame means having a series of windows, translucent means on said frame member and carrying scales thereon in substantial registration with said windows, a movable shutter on said frame, said shutter comprising a sheet metal channel member formed with openings positioned to progressively uncover the windows of the frame, said shutter having integral supports carrying lamps opposite said openings.

CORNELIUS G. ELY.
EARL H. ALLEN.